No. 753,549. PATENTED MAR. 1, 1904.
R. W. COOKE.
BRAKE LEVER ATTACHMENT.
APPLICATION FILED MAY 27, 1903.
NO MODEL.

WITNESSES:
Geo. W. Naylor.
Isaac B. Owens.

INVENTOR
Robert W. Cooke
BY
Munn & Co.
ATTORNEYS.

No. 753,549. Patented March 1, 1904.

UNITED STATES PATENT OFFICE.

ROBERT WILLING COOKE, OF CONDON, OREGON.

BRAKE-LEVER ATTACHMENT.

SPECIFICATION forming part of Letters Patent No. 753,549, dated March 1, 1904.

Application filed May 27, 1903. Serial No. 158,956. (No model.)

*To all whom it may concern:*

Be it known that I, ROBERT WILLING COOKE, a citizen of the United States, and a resident of Condon, in the county of Gilliam and State of Oregon, have invented a new and Improved Brake-Lever Attachment, of which the following is a full, clear, and exact description.

The object of this invention is to provide a brake-lever pawl which may be thrown into or out of action by momentum due to the movement of the brake-lever. This enables the brake-lever to be operated from a distant point through the medium of a rope or other connection, so that by simply giving the lever a jerk the pawl is thrown into inactive position and the lever may then be released.

This specification is an exact description of one example of my invention, while the claims define the actual scope thereof.

Reference is to be had to the accompanying drawings, forming a part of this specification, in which similar characters of reference indicate corresponding parts in both views.

Figure 1:
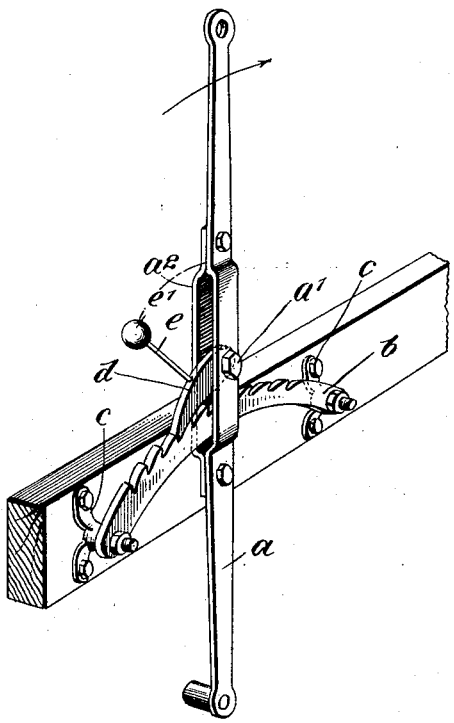
Figure 2:
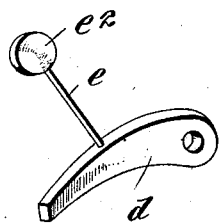

Figure 1 is a perspective view of the invention; and Fig. 2 is a detail view of the pawl, showing a slight change in the construction thereof.

$a$ indicates the brake-lever, and $b$ indicates the usual quadrant with which the lever works. $c$ indicates peculiarly-constructed brackets for holding the quadrant in place, these brackets permitting the reversal of the quadrant, so as to fit the lever and quadrant in various positions to the wagon or to the other apparatus with which the device is used.

$d$ indicates the pawl, which is pivoted to the lever at the point $a'$.

$a^2$ indicates a strap which is fastened alongside of the lever and offset therefrom to form a pocket in the lever, in which pocket the pawl is pivoted.

Attached to the pawl and projecting outward therefrom is an arm $e$, which carries a spherical weight $e'$, as shown in Fig. 1, or, if desired, a disk-shaped weight $e^2$, as shown in Fig. 2.

When the parts are in the position shown in Fig. 1, the weight $e'$ tends to hold the pawl engaged with the quadrant. However, should the lever be given a sharp movement in the direction of the arrow in Fig. 1 the momentum acquired by the weight $e'$ or $e^2$ will cause the pawl and its attachment to be thrown against the lever $a$, thus releasing the pawl and allowing the lever to move leftward over the quadrant, the pawl remaining momentarily in this position, owing to its inertia. As soon as the movement of the lever is stopped the pawl falls by gravity back into engagement with the quadrant.

This device enables the lever to be operated from a distant point, and by its means the pawl may be automatically disengaged from the quadrant. For example, should the invention be applied to a farm-wagon a rope may be attached to the brake-lever and this rope led to the driver on the saddle-horse of the team, so that the driver by drawing on the rope may release the brake without leaving the saddle.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. The combination with a lever and a quadrant, of a pawl pivoted to the lever at one end and coacting at the other end with the quadrant, a weight, and means for attaching the weight to the pawl at a point intermediate its ends and projecting the weight laterally from the pawl.

2. The combination of a lever, a quadrant, a free pawl pivotally mounted on the lever and coacting with the quadrant, and a weight attached to and projected laterally from said free pawl.

In testimony whereof I have signed my name to this specification in the presence of two subscribing witnesses.

ROBERT WILLING COOKE.

Witnesses:
S. A. PATTISON,
E. T. HOLLENBECK.